United States Patent
Rigby et al.

(10) Patent No.: US 6,475,457 B2
(45) Date of Patent: Nov. 5, 2002

(54) PROCESS FOR MANUFACTURING POTASSIUM NITRATE FERTILIZER AND OTHER METAL NITRATES

(75) Inventors: William J. Rigby, 701 Burning Tree La., Naperville, IL (US) 60563; Keith D. Cochran, Killen, AL (US); Timothy G. Holt, Florence, AL (US)

(73) Assignee: William J. Rigby, Naperville, IL (US)

( * ) Notice: Subject to any disclaimer, the term of this patent is extended or adjusted under 35 U.S.C. 154(b) by 0 days.

(21) Appl. No.: 10/000,412

(22) Filed: Nov. 2, 2001

(65) Prior Publication Data

US 2002/0110512 A1 Aug. 15, 2002

Related U.S. Application Data

(63) Continuation-in-part of application No. 09/100,994, filed on Jun. 22, 1998, now Pat. No. 6,365,122.

(51) Int. Cl.$^7$ .............................................. C01B 21/48
(52) U.S. Cl. ...................... 423/395; 423/398; 423/399; 423/101; 423/143; 423/162; 423/194
(58) Field of Search ................................. 423/395, 398, 423/399, 99, 101, 138, 140, 143, 155, 158, 162, 179, 184, 194; 422/139, 140, 141, 143, 144, 145; 71/58, 59

(56) References Cited

U.S. PATENT DOCUMENTS

| | | | |
|---|---|---|---|
| 1,500,289 A | | 7/1924 | Webber |
| 1,604,660 A | * | 10/1926 | Ross et al. ................. 202/236 |
| 1,965,400 A | * | 7/1934 | Whittaker et al. ........... 423/398 |
| 2,902,341 A | * | 9/1959 | Baniel et al. ............... 423/309 |
| 2,963,345 A | * | 12/1960 | Smith et al. ................ 423/398 |
| 3,563,701 A | | 2/1971 | Cannon |
| 3,717,440 A | | 2/1973 | Cannon |
| 3,983,222 A | * | 9/1976 | Lehto ........................ 23/293 R |
| 3,987,150 A | * | 10/1976 | Gould et al. ................ 423/386 |
| 4,378,342 A | * | 3/1983 | Manor et al. ............. 423/390.1 |
| 4,465,568 A | * | 8/1984 | Dotson et al. .............. 204/296 |
| 4,776,930 A | * | 10/1988 | Bianchi et al. ............. 205/480 |
| 5,110,578 A | * | 5/1992 | Abidaud ..................... 423/181 |

OTHER PUBLICATIONS

Pell et al, Fluidized–Bed Systems, Section 17: Gas–Solid Operations and Equipment, Perry's Chemical Engineers' Handbook, 7th Edition, McGraw–Hill, pp. 17–2 to 17–19, 1997.*

* cited by examiner

Primary Examiner—Stanley S. Silverman
Assistant Examiner—Eileen E. Nave
(74) Attorney, Agent, or Firm—Emrich & Dithmar

(57) ABSTRACT

A process for producing potassium nitrate and other metal nitrates from the chlorides, sulfates, oxides of these metals. The process uses nitrogen dioxide as a true fluidizing medium in shallow beds of the aforementioned solids at moderately elevated temperatures in a continuous counter current process to convert the metal chlorides, sulfates, and oxides, into metal nitrates and effluent gas and water vapor. The process may be carried out in a series of true fluidized beds arranged in a vertical configuration so that the solids flow downward due to the fluidized process and the nitrogen dioxide gas flows counter currently in an upward direction producing pure metal nitrates at the bottom and nitrosyl chloride gas and/or water vapor at the top.

21 Claims, 3 Drawing Sheets

US 6,475,457 B2

PROCESS FOR MANUFACTURING POTASSIUM NITRATE FERTILIZER AND OTHER METAL NITRATES

RELATED APPLICATIONS

This is a continuation-in-part to application Ser. No. 09/100,994 filed Jun. 22, 1998, now U.S. Pat. No. 6,365,122 B1 issued Apr. 2, 2002.

FIELD OF THE INVENTION

This invention relates to a process for the reaction of water moistened particulate metal chlorides, sulfates or oxides with nitrogen dioxide gas in a fluidized state, with the production of a solid having a composition composed of the metal and the nitrate ion. More particularly, the invention relates to the production of potassium nitrate or calcium nitrate and nitrosyl chloride gas (depending on the composition of the particulate) using nitrogen dioxide gas and water moistened particulate potassium chloride or calcium sulfate in an energy efficient process using counter current flow and fluidized bed technology. The unique aspects of this process is that it permits the reaction to take place at a rapid rate at moderately elevated temperatures while retaining essentially the same crystal size as the original potassium chloride or calcium sulfate. The counter current aspects of the invention permit the production of potassium nitrate or calcium nitrate and nitrosyl chloride gas (depending on the solid) essentially free of nitrogen dioxide.

BACKGROUND OF THE INVENTION

Potassium is one of three essential elements (N.P.K.) in the life cycle of all plants. Fertilizers therefore generally contain all three in one form or another. Potassium, however is generally present as a chloride since it is the most readily available, least expensive potassium compound. For many crops (e.g., citrus, tobacco) a fertilizer containing small amounts of chlorides is toxic. Thus, there is created a sizable demand for manufactured potassium nitrate as a non-chloride source of potassium. However, it must be produced at a relatively low cost to compete with existing processes such as that produced from natural deposits. The use of potassium nitrate as a fertilizer was first suggested by Glauber in 1655. A few years later its value was discussed by Digby in what is said to be the earliest known record of the actual use of fertilizers as distinct from decaying organic matter. The world supply of potassium nitrate was formerly derived from incrustations on the soils around habitations in tropical countries, chiefly India, Sri Lanka, Mexico and Egypt. Its presence there is due to the decomposition of organic matter by nitrifying organisms in soils containing soluble potassium compounds.

Much of the potassium nitrate in commerce was formerly made by the "Conversion Process" in which sodium nitrate and potassium chloride undergo a double decomposition. This process depends on the wide variation in the solubility of potassium nitrate in hot and cold solutions.

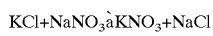

This process has been displaced by more efficient operations as will be shown as follows:

RELATED ART

Potassium nitrate, otherwise known as saltpeter or nitrate of potash, is important in the production of fertilizers, explosives, glass, and numerous other industrial chemicals. It is one of the oldest known "industrial" chemicals. Potassium nitrate has been used on a large scale since around the year 1300, when the Chinese discovered that saltpeter could be combined with sulfur and charcoal to produce the common explosive known as black powder. The ever-growing demand for potassium nitrate for these and other such uses has resulted in a prolonged search for improved potassium nitrate production processes, and various methods have been invented to produce potassium nitrate. For example, large quantities of potassium nitrate are commercially produced by the reaction of potassium chloride with nitric acid in the presence of oxygen, yielding the following overall reaction:

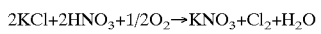

The potassium chloride and nitric acid must be reacted at 100° C. to produce potassium nitrate, nitrosyl chloride and water as follows:

The nitrosyl chloride is then oxidized to chlorine and nitrogen dioxide, $NO_2$, with nitric acid. See Chemical Process Industries, 4$^{th}$ Ed., Shreve and Brink, McGraw-Hill, Inc., New York (1977), pp. 272–273.

Smith et al, in U.S. Pat. No. 2,963,345, disclose a process for producing potassium nitrate, which involves agitating solid particulate potassium chloride with liquid nitrogen peroxide under anhydrous conditions at a temperature of 15° C.; excess nitrosyl chloride vapors produced by the reaction are continuously withdrawn to maintain the reaction. Potassium nitrate and unreacted potassium chloride are then separated by addition to a brine that contains dissolved potassium nitrate and potassium chloride; the brine solution is heated to about 85° C. to dissolve the potassium nitrate, but not the solid particles of potassium chloride. The solid particles of potassium chloride are then separated by filtration. Large volumes of potassium nitrate are also produced by the reaction of sodium nitrate with potassium chloride, the overall reaction being:

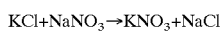

This process requires that potassium chloride be dissolved in a hot solution of sodium nitrate; upon heating, sodium chloride crystals are formed. The hot potassium nitrate solution is then run through the sodium chloride crystals forming at the bottom of the reaction vessel. However, a mixture of potassium nitrate and sodium chloride is formed, so additional processing operations are required to separate potassium nitrate.

Lehto, in U.S. Pat. No. 3,983,222, discloses a continuous process for producing potassium nitrate, which includes the steps of extracting nitrate from aqueous solutions with an organic amine salt dissolved in an organic solvent, separating the organic phase containing the extracted nitrate from the aqueous phase, and stripping the organic base with a potassium salt stripping solution having a pH of at least 0.5. The stripping solution also contains nitrate ions and potassium ions with the concentration of potassium nitrate maintained high enough to induce crystallization of potassium nitrate from the stripping solution continuously.

Dotson et al, U.S. Pat. No. 4,465,568, uses an electrolytic process to produce chloride free mixtures of sodium nitrate and potassium nitrate.

Baniel et al. discloses in U.S. Pat. No. 2,902,341 a process for the preparation of water soluble metal sulfates, phosphates, or nitrates by the reaction in aqueous medium of the chlorides of the respective metals with free sulfuric phosphoric or nitric acid, respectively. Hydrochloric acid is extracted from the aqueous liquid with a solvent of limited mutual miscibility with water but being a solvent for hydrochloric acid but not for any of the metal salts. While this process has been exploited commercially, it lacks the simplicity and efficiency of the instant method. Large volumes of liquids must be handled; crystallization, extraction, separation, and distillation processes are required to recover the desired salts and solvents. Volatile organic solvents are utilized in the extraction process requiring stringent environmental and safety standards. The major plant utilizing this process has suffered serious fires, disrupting production for significant periods of time.

Bianchi et al discloses in U.S. Pat. No. 4,776,930 a process for the production of potassium nitrate by reacting a solution of potassium carbonate with nitric acid. This process utilizes expensive raw materials (potassium carbonate produced by electrolytic process) and requires substantial energy to recover the potassium nitrate from the solution.

Abidaud et al discloses in U.S. Pat. No. 5,110,578 a process for potassium nitrate via ion exchange on a continuous basis using relatively weak solutions of nitric acid and potassium chloride. High purity solid potassium nitrate is produced by crystallization. Significant energy is required to produce solid potassium nitrate by this process due to the dilute solutions produced (15% wt $KNO_3$ and 0.5% wt $KNO_3$) which must be neutralized by potassium hydroxide (KOH).

Manour et al discloses in U.S. Pat. No. 4,378,342 a method of producing potassium nitrate by reacting potassium chloride with nitric acid in an organic solvent. The resulting potassium chloride is separated from the solution which contains hydrochloric acid, nitric acid and the solvents which are washed and recovered. The remaining aqueous solution of hydrochloric acid contains some nitric acid which is recovered by solvent extraction producing a substantially nitrate free hydrochloric acid. Both the nitric acid and solvent are separated and returned to the process. This process is a refinement of Baniel et al and is thought to be practiced by Haife Chemical in Israel. The plant is quite large producing in excess of 300,000 tons of potassium nitrate per year. Nonetheless the process is very capital intensive employing many unit processes including distillation, centrifrigation, refrigeration, and several different trains of extraction. It is also somewhat hazardous having had serious fires in its solvent recovery units. It is also a labor and energy intensive operation due to the complexity of the process and the energy required for refrigeration, distillation, and drying operations.

A commercial process developed in the late 1960s for the Potash Division of American Metal Climax at Vicksburg, Miss. and still in existence under different ownership, reacts potassium chloride with 65% nitric acid and recycled strong 81% nitric acid to produce a nitric acid solution containing potassium nitrate which is recovered by vacuum crystallization, drying, melting and prilling operations. Complex acid and nitrogen dioxide recovery systems are required and low temperature fractionization to recover chlorine from reaction gases. This is an extremely capital intensive process. It is also labor and energy intensive because of the complexity of the operation and the significant number of unit operations required. All of the prior art processes for producing potassium nitrate are expensive or difficult to perform.

Processes that utilize nitric acid at elevated temperatures require specially constructed equipment to handle the highly corrosive reactants, and further, elevated reaction temperatures require high-energy inputs. Other prior art processes suffer from low yields of potassium nitrate or an impure product. Thus, there is a need for an inexpensive and continuous process for producing large quantities of potassium nitrate at ambient temperatures. All of the processes outlined in the prior discussion lack the relative simplicity, energy, and operating efficiency of the instant invention from which the finished product retains essentially the same size distribution and purity of the original solid feeds. The reaction proceeds rapidly and to completion. No external heat source is required and the process is continuous with halides or sulfates being fed in the top bed and nitrates extracted from the bottom; fluidization and gravity providing the means by which the product flows from bed to bed while counter current flow of gas and or air (the fluidizing medium) permits the strongest nitrogen dioxide gas stream to contact the most nearly converted feed while the most dilute gas contacts the raw feed thus minimizing contamination of the effluent nitrosyl chloride/ chlorine gas with nitrogen dioxide or nitric oxide gas.

SUMMARY OF THE INVENTION

The primary object of this invention is to eliminate the problems and inefficiencies of the prior art by providing a new process by which metal halides and or sulfates may be reacted with nitrogen dioxide to produce solid compounds containing nitrate anion while liberating a gaseous compound containing the metal alkali cation.

A further object of this invention is to provide a new highly energy efficient process for said reactions.

A further object of this invention is to provide a new simple and cost effective process for the manufacture of said compounds.

A further object of this invention is to provide the conditions whereby the new method may be effectively performed to produce the said reactions.

A further object of this invention is to provide a granular product which may be readily blended with existing products or may be further granulated to permit coating with a slow release coating.

A further object of the invention is to provide a cost effective method to produce a high quality potassium nitrate and/or calcium nitrate.

A further object of the invention is to provide a method to convert gypsum waste from phosphate operations to a useful fertilizer, while producing sulfur dioxide or sulfuric acid for recycle to the operation.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE INVENTION

DESCRIPTION OF THE PREFERRED EMBODIMENT

Figure 1:
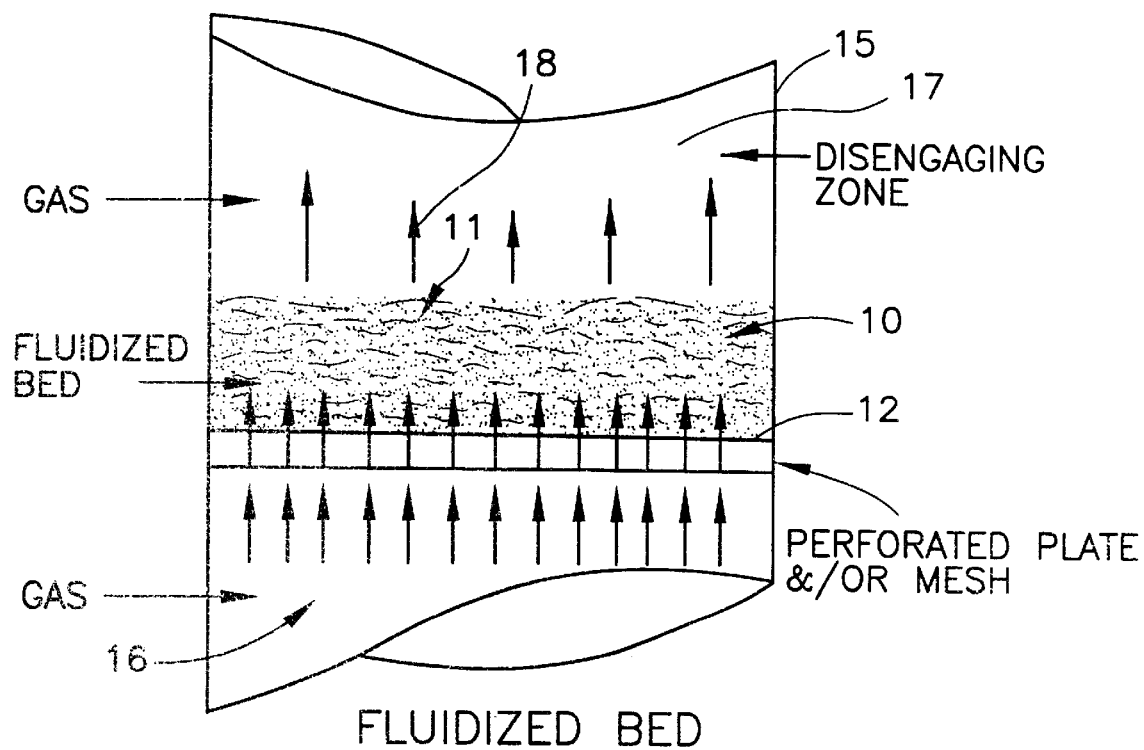
FIG. 1 is a elevational representation of a fluidized bed.

Referring now to FIG. 1, there is disclosed a fluidized bed 10 comprised of a plurality of particulates or an aqueous slurry of particulates 11 suspended above a perforated plate 12 in a container 15. The container 15 is shown as a representation of a cylindrical pipe but may be of any desired shape. The container 15 is provided with an inlet gas 16 below the perforated plate 12 and a gas outlet 18 above a disengaging zone 17. The disengaging zone 17 is the area above the perforated plate 12 necessary for any particulates or liquid entrained in the gas flowing through the perforated plate 12 to fall back into the fluidized bed 10.

A fluidized bed, as defined in "Fluidization" Kearns ed., McGraw Hill 1976, is defined as "dry solid particles kept in a randomly moving, suspended and moderately agitated condition by a stream of pressurized gas distributed through the bed so that the particles flow in a manner similar to a gently boiling liquid. This is usually accomplished by placing the particles on a perforated plate and a pressurized gas is forced through the perforations in the plate and the gas causes the particles to fluidize." True fluidized bed technology is well known in the art. This method may also be applied to a slurry in a manner similar to that employed in the ammonia distillation column in the Solvay Process where a slurry of calcium hydroxide is reacted with process liquors containing ammonium chloride to produce calcium chloride and recovering ammonia by steam distillation all in the same vessel.

Figure 2:
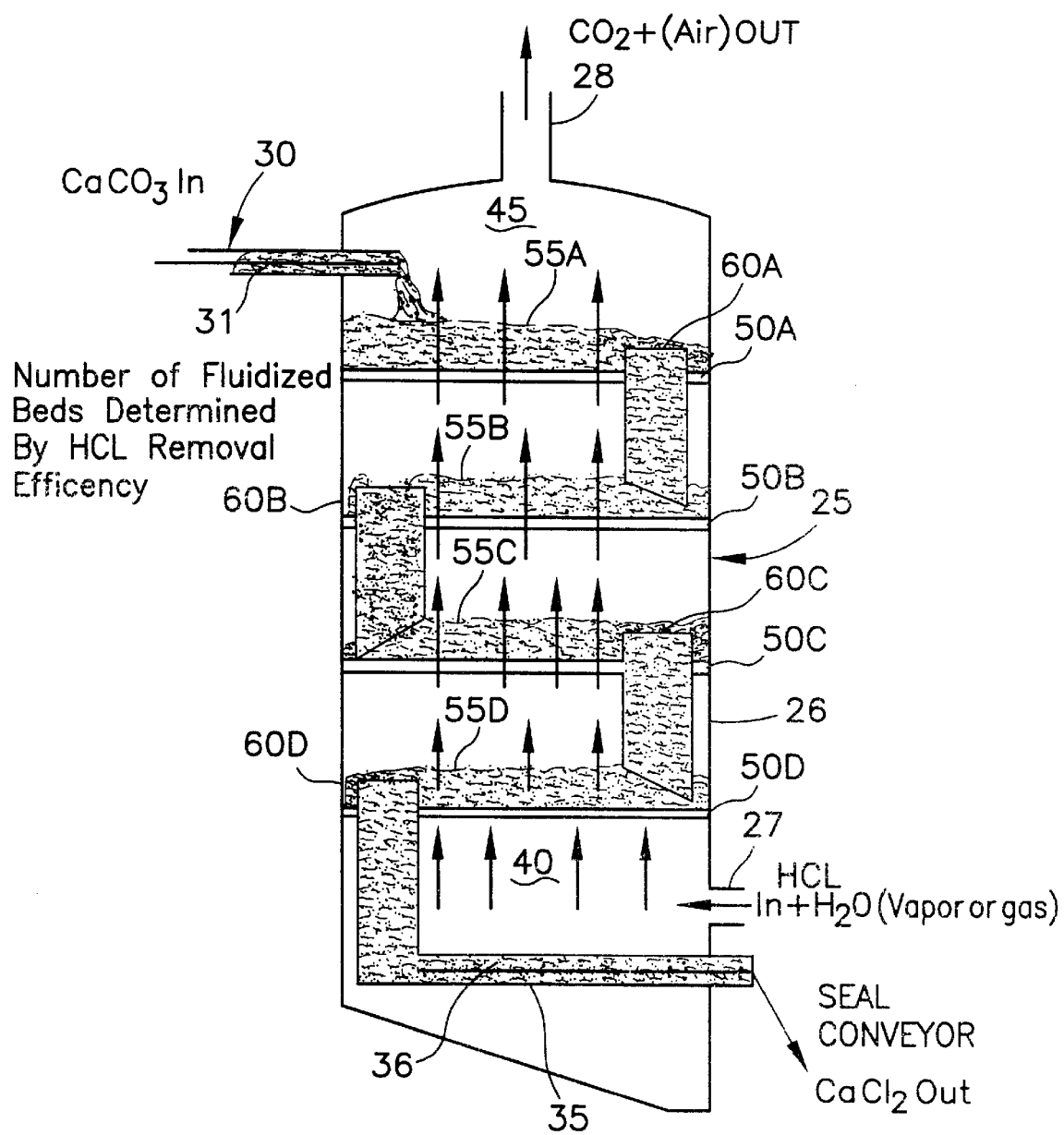
FIG. 2 is a side elevational view of fluidized beds arranged in vertical configuration.

Referring now to FIG. 2, there is another embodiment of the present invention in which a plurality of beds is arranged in vertical configuration. More particularly, a reactor 25 includes a cylindrical vessel 26 having a gas inlet 27 and a gas outlet 28. A particulate or slurry inlet conduit 30 houses an inlet screw mechanism or conduit 31 and a particulate or slurry outlet 35 houses a product screw or other exiting means mechanism 36. The particulate or slurry inlet conduit 30 is positioned near the top of the reactor 25 and the particulate or slurry outlet conduit 35 is positioned near the bottom of the reactor 25. The reactor 25 includes a gas plenum 40 in communication with the gas inlet 27 and an exhaust gas plenum 45 in communication with the gas outlet 28. There is a plurality of perforated plates 50A, 50B, 50C and 50D, each of which support a corresponding fluidized bed 55A, 55B, 55C, 55D thereupon comprising a plurality of particulates or slurries in a state of fluidization due to the gas entering through the gas inlet 27 and distributed through the hot gas plenum 40 and thereafter through the individual perforated plates, as shown in FIG. 2. Each of the fluidized beds 55A through D is provided with a particulate or slurry overflow conduit 60A–D that communicates slurry or particulates from each of the fluidized beds to the next adjacent downwardly positioned bed. For instance, conduit 60A communicates particulates or slurry from bed 55A to bed 55B and conduit 60B provides communication of particulates or slurries from bed 55B to 55C and so on. The particulate or slurry overflow conduit 60D provides communication between the bed 55D and the particulate or slurry outlet conduit 35. While the reactor 25 includes internal overflow conduits 60A–D, external conduits can also be employed.

As will be hereinafter described, nitrogen dioxide gas supplemented with nitrogen or dry air and oxygen if necessary is introduced through the inlet 27 and flows upwardly at a sufficient pressure to fluidize the beds 55D through 55A. As may be understood, the nitrogen dioxide concentration in the inlet gas is at its highest value since chemical reactions in each bed with halide or sulfate particulates or slurry reduces the concentration of nitrogen dioxide in the gas while increasing the concentration of nitrate in the particulates or slurry until in the upper most bed 55A, the concentration of the nitrogen dioxide in the gas flowing therethrough is at the lowest such that the gases in the exhaust gas plenum 45 is substantially free of nitrogen dioxide. Nitrate concentration in the bed 55D is at the greatest as most if not all of the halide or sulfate has been converted to the corresponding nitrate.

Although the figure shows the use of potassium chloride particulates flowing into the bed 55A through the particulate inlet 30 and potassium nitrate flowing out of the bed 55D through the particulate outlet conduit 35, this is for purposes of illustration only. It should be understood that the particulates may be a slurry and that the chloride may be a sulfate or oxide and the metal may be any one of potassium, sodium, calcium, or mixtures thereof.

Figure 3:
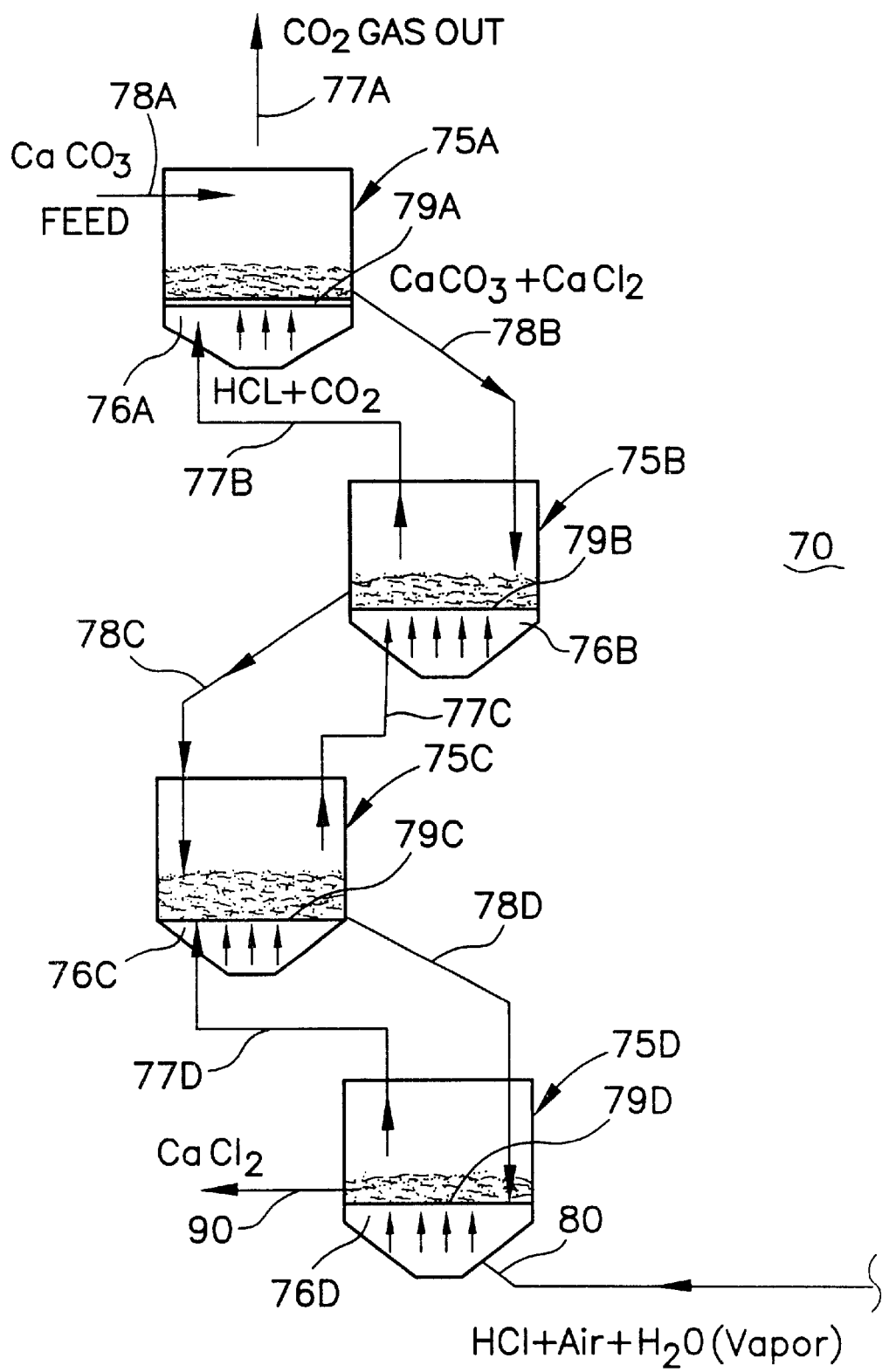
FIG. 3 is a schematic representation of a number of fluidized beds arranged in series connection.

Referring now to FIG. 3, there is shown in diagrammatic representation, a system 70 comprised of a plurality of reactors 75A, 75B, 75C and 75D, each connected by gas and particulate conduits as will be described. More particularly, there is provided in each reactor 75A–D a corresponding gas inlet plenum 76A–D, a gas outlet plenum 77A–D and solids inlet 78A–D. The flow of materials is the same for system 70 as previously described with respect to the reactor 25 but in the system 70, there are a number of discrete reactors rather than a single vessel as previously described. More particularly, the system 70 includes a gas inlet 80 in communication with the gas inlet plenum 76D of reactor 75D. The gas inlet 80 is in communication with a source of nitrogen dioxide gas and in those reactions where it is necessary with a source of nitrogen or dry air or oxygen 83. Recycle of a small percentage of the effluent gas may be required to supplement fluidization. The recycle gas if required is compressed by a blower and combined with the nitrogen dioxide gas through the gas inlet conduit 80 to the plenum 76D for flow through the various perforated plates 79A–D in each of the reactors to form the corresponding fluidized bed in each of the reactors 75A–D. The product outlet 90 removes the formed metal nitrate from the reactor 75D whereas the gas outlet 77A conducts the gases produced or water vapor out of the endmost reactor.

It is also possible to employ a horizontal vessel with a series of discrete fluidized bed compartments to accomplish the reaction since the fluidization of the beds will permit counter current flow of gas and solids.

While the preferred embodiment of the instant invention is to use a moistened particulate (up to approximately 2.5% moisture) and nitrogen dioxide gas it is possible to use an aqueous slurry of the particulate (up to 66% water) and either nitric acid vapor or nitric oxide gas to accomplish conversion of the metal particulates to the corresponding nitrate. These variations confirmed by experimental work produce a combination of off gases which require a more complex recovery system. Fluidization of the slurry is possible by maintaining the desired gas velocity through the perforated distribution plates.

As can be seen therefore, there are a variety of apparatus and systems which can accommodate the present reaction but in all cases, it is necessary to employ true conventional fluidization and to have the particulates flow countercurrent to the fluidizing gas and for the concentration of nitrogen dioxide to diminish as the gas flows through successive beds while the concentration of solid nitrates increases as the particulates flow in countercurrent relationship to the gas flow.

The present invention is directed to a method of producing metal nitrates of high quality for commercial use. The invention is based on the reaction of nitrogen dioxide gases in contact with chlorides, sulfates, and oxides of certain members of the alkali metals, alkaline metal earths and transition metals in shallow beds maintained in a conventional or true fluidized state, so as to rapidly convert without significant particle size degradation, the solid particulates to solid compounds consisting of the anion of the metal and the nitrate cation while liberating water vapor and nitrosyl chloride and chlorine in certain instances. By shallow beds is meant a bed having a depth of about one to four feet. This new method allows a heretofore-unknown energy cost efficient and continuous method for producing said compounds.

The instant method consists of contacting moistened metal chlorides, sulfates or oxides with nitrogen dioxide gas at a moderately elevated temperature in a series of shallow fluidized beds. High conversion {91%} can be achieved in a very short period of time, i.e. from several minutes to one to two hours depending on the temperature of the gas and fluidized solids and concentration of nitrogen dioxide in the gas, with the liberation of nitrosyl chloride and (postulated) sulfur dioxide, or water depending on the initial solid feed.

Having described the basic concepts of the instant invention reference is made to the following examples, which are provided to illustrate but not limit the preferred method of the invention and other similar methods of producing metal chlorides.

EXAMPLE 1

The preferred embodiment of the instant invention is to introduce nitrogen dioxide gas and a small quantity of water vapor, preferably at a temperature in the range of 80° to 600° F. into a series of shallow beds, one to four feet deep, of potassium chloride. The nitrogen dioxide gas is preferably produced as a product of a commercial operation or by oxidation of ammonia. It is apparent that with proper reactor design as is known to one skilled in the art, variable bed depths as previously described, counter current gas and solid flow and true fluidization, continuous production rates of ten or more tons per hour can be maintained even though residence time of solids in the reactor may be as much as two hours.

The apparatus may consist of a vertical column containing a number of perforated plates, connected to each other either by internal or external sealed overflows. The nitrogen dioxide gases and possibly nitrogen, dry air, or oxygen if required are fed into the bottom of the column below the bottom-perforated plate. Solid potassium chloride moistened to about 2.5% moisture is introduced on a continuous basis into the top plate. The depth of the bed is controlled by the height of the overflow above the perforated plate. The solids because of true fluidization behave like a liquid and flow down the overflows into the next lower plate, which is sealed to prevent gas up flow by the solids in the overflow connection and in the lower bed. The process continues plate by plate until the particulates reach the last plate from which they flow into a seal conveyor. At each plate, gas and particulates are intimately contacted due to the boiling action caused by the fluidization of the particulates. Heat exchange between particulates and gas is exceptionally efficient due to this contact in which the reaction process proceeds and reaction heat is liberated. Inter-plate cooling either external or internal may be required to prevent temperature excursions. A head differential exists between the inlet and exit location at each plate resulting in the flow of the solids from inlet to exit. The maximum concentration differential between the nitrate in the particulates and the nitrogen dioxide gas is maintained in each plate as the particulates flow down the reactor, and the gas proceeds upward. This is due to the depletion of the nitrogen dioxide in the gas stream as it reacts with the particulates which are converted to nitrates. At the bottom plate the maximum nitrogen dioxide gas concentration contacts solid particulates totally or almost totally converted to the nitrates. The high concentration nitrogen dioxide gas results in conversion of the remaining particulates to their respective nitrate. At the top several plates gas almost depleted of nitrogen dioxide contacts the particulate feed and leaves the reactor depleted of nitrogen dioxide. Nitrosyl chloride gas if produced in the sequential fluidized reaction zones leaves the reaction column and is recovered for processing. The reaction is based on the findings of Whittaker, et al as published in Industrial and Engineering Chemistry Vol. 23, No. 12, December 1931, in which he demonstrated that nitrogen dioxide gas when passed through a small laboratory fixed bed of potassium chloride in the presence of a small amount of water was completely converted to potassium nitrate within a period of three hours. The reaction is indicated as follows:

$$KCl(g) + 2NO(g) \rightarrow KNO_3(g) + NOCl(g)$$

where the reaction products are potassium nitrate and nitrosyl chloride, which can be oxidized to chlorine gas which can be recovered and nitrogen dioxide which can be recycled to the reacting vessel.

$$2NOCl(g) + O_2(g) \rightarrow Cl_2(g) + 2NO_2(g)$$

Higher gas temperatures may be employed to increase the reaction rate, however, the reaction is exothermic, so that rather than adding heat, inter plate cooling means either internal or external may be necessary to mitigate temperature excursions. Operation at a lower temperature is not a significant impediment since with more than one bed, proper reactor design, as is known to one skilled in the art, variable bed depths as previously described and conventional fluidization, continuous production rates of ten or more tons per hour can be maintained even though residence time of solids in the reactor is as much as two hours.

In a series of experiments designed to determine the effect of temperature and moisture addition it was found that best results were obtained at moderate temperatures and about 2% to 3% water. Oxygen was added in the event nitric oxide was present, however it appeared to have little or no effect. Some of these results are presented below.

Fluidization Test Variables

| Test # | Date | Run Time (min) | % H₂O added to crystals | Batch size (# yrs) | Avg. Inlet Air Temp (° F.) | Avg. NO₂ Rate (lb/min) | Avg. H₂O Rate (lb/min) | Avg. O₂ Rate (lb/min) | % KNO₃ |
|---|---|---|---|---|---|---|---|---|---|
| 3-2 | 4/15 | 120 | 0% | 5 | 450–575 | 0.34 | 0.068 | 0.52 | 6.88% |
| 3-3 | 4/23 | 120 | 0% | 5 | 280–340 | 0.34 | 0.47 | 0.27 | 11.0% |
| 3-4 | 4/29 | 120 | 0% | 5 | 286–355 | 0.28 | 1–2 psig | 0.13 | 12.15% |
| 3-5 | 5/6 | 40 | 3% | 5 | 106–108 | 0.24 | 0.00 | 0.00 | 21.64% |
| 3-6 | 5/8 | 20 | 3% | 5 | 98 | 0.44 | 1 psig | 0.44 | 18.37% |
| 3-7 | 5/21 | | Aborted test | | | | | | |
| 3-8 | 5/21 | 20 | 2% | 5 | 74–78 | 0.48 | 0.00 | 0.65 | 14.54% |
| 3-9 | 5/23 | 60 | 1% | 2.5 | 85–93 | 0.39 | 0.0026 | 0.62 | 5.72% |
| 3-10 | 5/27 | 70 | 3% | 2 | 94–105 | 0.39 | 0.0012 | 0.63 | 8.90% |
| 3-11 | 6/4 | 50 | 3% | 2 | 235–272 | 0.29 | 0.054 | N₂ = 0.34 | 7.82% |

EXAMPLE 2

Another example which demonstrates a less preferable embodiment of the current invention requires use of an aqueous slurry of solids (particularly if they are relatively insoluble) into which is introduced nitrogen dioxide gas. The slurry bed is maintained in a fluidized state on a perforated support plate through which the gas passes. Plate design and gas flow velocity prevents bypass through the perforations while bed depth is maintained by the height of the overflow above the plate surface. Air or nitrogen may be used to sustain fluidization while slurry density may vary up to 50% solid or higher although higher particulate concentrations are preferred. Operation and process is similar to that previously outlined for the moistened solid described in Example 1, that is, the requirement of counter current flow of gas and slurry and fluidized (agitated), beds is essential. The slurry is filtered or centrifuged on exiting the apparatus, and neutralized with a sodium hydroxide or soda ash wash. The filtrate is recycled to provide a slurry for new feed material while a small purge is maintained to minimize unwanted byproducts. This embodiment is effective for metal oxides and sulfates.

| Test | Date | Run Time | % H₂O for slurry | % CaSO₄ for slurry | Batch size (g) | Avg. NO₂ Inlet Temp. (° F.) | Avg. NO2 Rate (lb/min) | Avg. Com. Air Rate (lb/min) | % Ca(NO₃)₂ |
|---|---|---|---|---|---|---|---|---|---|
| 3-42* | 9/5 | 50 | 5 | 50 | 50 | 90 | 0.20 | 0.16 | 16.72 |
| 3-43** | 9/5 | 50 | 5 | 50 | 50 | 90 | 0.20 | 0.32 | 18.70 |
| 3-44*** | 9/5 | 50 | 5 | 50 | 50 | 90 | 0.20 | 0.32 | 6.71 |

*= Starting material was anhydrous calcium sulfate
**= Starting material was calcium sulfate (hemi-hydrate)
***= Starting material was calcium sulfate (di-hydrate)
L.S.R. = laboratory scale reactor As may be seen therefore, the invention is applicable to particulate metal salts such as chlorides, sulfates or oxides and preferably with anions of potassium, sodium, calcium, magnesium, zinc, iron and various mixtures thereof. A variety of nitrogen-containing gases may be employed as fluidizing mediums or part of the fluidizing medium, such as NO₂, NO, HNO₃ vapor and various mixtures thereof.

While there has been disclosed what is considered to be the preferred embodiment of the present invention, it is understood that various changes in the details may be made without departing from the spirit or sacrificing any of the advantages of the present invention.

We claim:
1. A process for converting particulates of at least one selected from the group consisting of chlorides, sulfates, and oxides of a metal to corresponding nitrates, which is effective in dry conditions, comprising contacting the particulates with a fluidizing nitrogen-containing gas at a velocity sufficient to form a true fluidized bed of the particulates, maintaining the true fluidized bed at a temperature in a range of from about 80° F. to about 800° F. for a time sufficient to permit the particulates to be converted to the corresponding nitrates while producing an effluent gas.

2. The process of claim 1, wherein the fluidizing nitrogen-containing gas is selected from the group consisting of nitrogen dioxide, nitric oxide, nitric acid vapors and mixtures thereof.

3. The process of claim 1, wherein the metal is selected from the group consisting of potassium, sodium, calcium, magnesium, zinc, iron, and mixtures thereof.

4. The process of claim 1, where a percentage of the effluent gas is recycled to sustain fluidization.

5. The process of claim 1, where nitrogen gas or dry air is added to the fluidizing nitrogen-containing gas or added separately to sustain fluidization.

6. The process of claim 5, where the effluent gas contains nitrosyl chloride.

7. The process of claim 6, where the effluent gas is recovered for subsequent processing.

8. The process of claim 1, wherein the particulates are potassium chloride and are moistened with about 2.5% by weight water.

9. The process of claim 1, wherein the true fluidized bed has a depth in a range of from about 12 inches to about four feet.

10. The process of claim 1, wherein the fluidizing nitrogen-containing gas is maintained in contact with the particulates for a time sufficient to remove substantially all nitrogen dioxide from the effluent gas.

11. A process for converting particulates of at least one selected from the group consisting of chlorides, sulfates, and oxides of a metal selected from members of the group consisting of alkali metals, alkaline metal earths, transition metals and mixtures thereof to corresponding nitrates, comprising establishing a series of fluidized beds of the particulates by passing a fluidizing gas containing a nitrogen oxide gas and dry air through the particulates at a velocity sufficient to establish and maintain the particulates in a fluidized state, the fluidizing gas leaving one fluidized bed and flowing through another fluidized bed in the series of fluidized beds until the fluidizing gas leaving the last fluidized bed in the series of fluidized beds is substantially free of nitrogen dioxide and the particulates leaving the first fluidized bed in the series of fluidized beds being substantially free of chlorides, sulfates, and oxygen.

12. The process of claim 11, wherein the fluidizing gas moves countercurrent to the direction of the particulates.

13. The process of claim 11, wherein the metal is selected from the group consisting of potassium, calcium, sodium, magnesium, zinc, iron, and mixtures thereof and the nitrogen oxide gas is selected from the group consisting of nitrogen dioxide, nitric oxide, nitric acid vapors and mixtures thereof.

14. The process of claim 11, where a percentage of the effluent gas is recycled to sustain fluidization.

15. The process of claim 11, where dry air or nitrogen is added to the nitrogen oxide gas to sustain fluidization.

16. The process of claim 11, where the effluent gas is recovered.

17. The process of claim 11, wherein each fluidized bed of the series of fluidized beds has a depth in a range of from about 12 inches to about four feet.

18. The process of claim 11, wherein the series of fluidized beds are in a single vessel vertically arranged such that particulates from one fluidized bed flows into a lower fluidized bed and gas exiting from a lower fluidized bed flows through a higher fluidized bed.

19. The process of claim 11, wherein the series of fluidized beds are vertically arranged such that particulates flow downwardly counter currently to the fluidizing gas flowing upwardly and particulates with a highest content of chlorides, sulfates, oxides are contacted with fluidizing gas having a lowest nitrogen dioxide content.

20. The process of claim 11, wherein the particulates are potassium chloride.

21. The process of claim 11, wherein the particulates are calcium sulfate.

\* \* \* \* \*

UNITED STATES PATENT AND TRADEMARK OFFICE
CERTIFICATE OF CORRECTION

PATENT NO. : 6,475,457 B2  Page 1 of 1
DATED : November 5, 2002
INVENTOR(S) : William J. Rigby et al.

It is certified that error appears in the above-identified patent and that said Letters Patent is hereby corrected as shown below:

Column 2,
Line 14, delete

"2KCl+2HNO$_3$ + 1/2O$_2$  KNO$_3$ + Cl$_3$ + H$_2$O"

and insert

-- 2KCl+2HNO$_3$ + 1/2O$_2$ 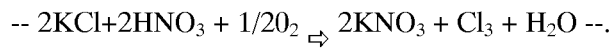 2KNO$_3$ + Cl$_3$ + H$_2$O --.

Signed and Sealed this

Seventeenth Day of June, 2003

JAMES E. ROGAN
*Director of the United States Patent and Trademark Office*